Sept. 30, 1969 W. R. BOYD 3,470,381
PHOTOELECTRIC SCANNING SYSTEM FOR ULTRACENTRIFUGES
HAVING PERIODIC CALIBRATION MEANS
Filed May 3, 1965 5 Sheets-Sheet 1

INVENTOR.
WILLIAM R. BOYD
BY
*Flehr and Swain*
ATTORNEYS

INVENTOR.
WILLIAM R. BOYD

United States Patent Office 3,470,381
Patented Sept. 30, 1969

3,470,381
PHOTOELECTRIC SCANNING SYSTEM FOR
ULTRACENTRIFUGES HAVING PERIODIC
CALIBRATION MEANS
William R. Boyd, Oakland, Calif., assignor to Beckman
Instruments, Inc., a corporation of California
Filed May 3, 1965, Ser. No. 452,681
Int. Cl. G01n 21/26
U.S. Cl. 250—218                                        11 Claims

ABSTRACT OF THE DISCLOSURE

A photoelectric scanning system for use with a centrifuge system for providing and recording an electrical signal whose amplitude varies as a function of the concentration distribution of a sample being centrifuged and including means for generating at selected time intervals an electrical calibration signal against which the electrical information signal may be compared.

---

This invention relates generally to a photoelectric scanning system for ultracentrifuges.

One very useful means for determining the concentration distribution of material in solution is to measure the light attenuation (absorption) by the solution when it is placed in a suitable light beam. Since many materials absorb strongly at one or more wavelengths in the near ultra-violet end of the visible spectrum, an ultraviolet optical system provides a sensitive means for detecting the concentration distribution of dilute samples.

In the past the only means of providing information with regard to absorption in a form which the experimenter can use has been to expose photographic plates to the image formed by the light rays which pass through the sample. If the experimenter manages to expose the film for the proper period of time, he can then develop the film and obtain the absorption information after a period of time has elapsed. To make the information more useful, the developed photographic plate is scanned with auxiliary devices to give a signal representative of the variation in concentration of the sample.

Not only is this an inconvenient means of gathering data, but it allows ample opportunity for the information to be destroyed or altered by light leaks, development techniques, or inaccuracies of auxiliary measuring or calibrating equipment. Moreover, alignment of the optics by such processes is at best tedious and vexing. If something is amiss, it can go undetected until the photographic plates have been processed.

More recently, there have been built photoelectric systems for scanning the image formed by the light beam passing through a solution contained in a sample cell. Systems of this type have been described in articles appearing in the archives of "Biochemistry and Physics," vol. 99, pages 157–190 (1962), and 103, pages 379–400 (December 1963). The systems described in the aforementioned publications generally include a photoelectric scanning system for recording the concentration distribution of material in an ultracentrifuge sample cell during the centrifugation operation. The systems comprise a light source, a photo-responsive device and a lens system for directing the light through the cell and projecting an image of the cell on the photoresponsive device. Furthermore, means are provided for moving the photoresponsive device to scan across the image whereby variations in the amount of light transmitted by the cell at different parts of the same are converted to variations in electrical output. Means are also provided for receiving and processing these signals to provide an output signal which is indicative of the transmission through the sample contained in the cell.

It is a general object of the present invention to provide an improved photoelectric scanning system for ultracentrifuge cells which provides improved accuracy over a large range of light values.

It is a further object of the present invention to provide a photoelectric scanning system for ultracentrifuges which includes means providing convenient calibration of the apparatus.

It is a further object of the present invention to provide a photoelectric scanning system for ultracentrifuges in which the calibration signal passes through the same electronics as the signal from the photoelectric means whereby to provide more accurate calibration.

It is another object of the invention to provide a double beam spectrometer in which the two light paths are separated in time, rather than space, thus employing the same optics and obviating inaccuracies due to differences in properties of optical elements.

It is still a further object of the present invention to provide a photoelectric scanning system for ultracentrifuges including improved circuits for comparing pulses in a double beam device.

It is still a further object of the present invention to provide a photoelectric scanning system employing improved logic circuits for detecting and comparing pulses.

The foregoing and other objects of the invention will become more clearly apparent from the following description when taken in conjunction with the accompanying drawings.

Referring to the drawing.

Figure 7:
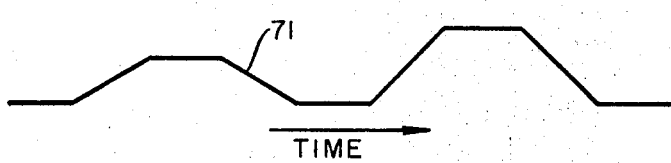
Figure 8:
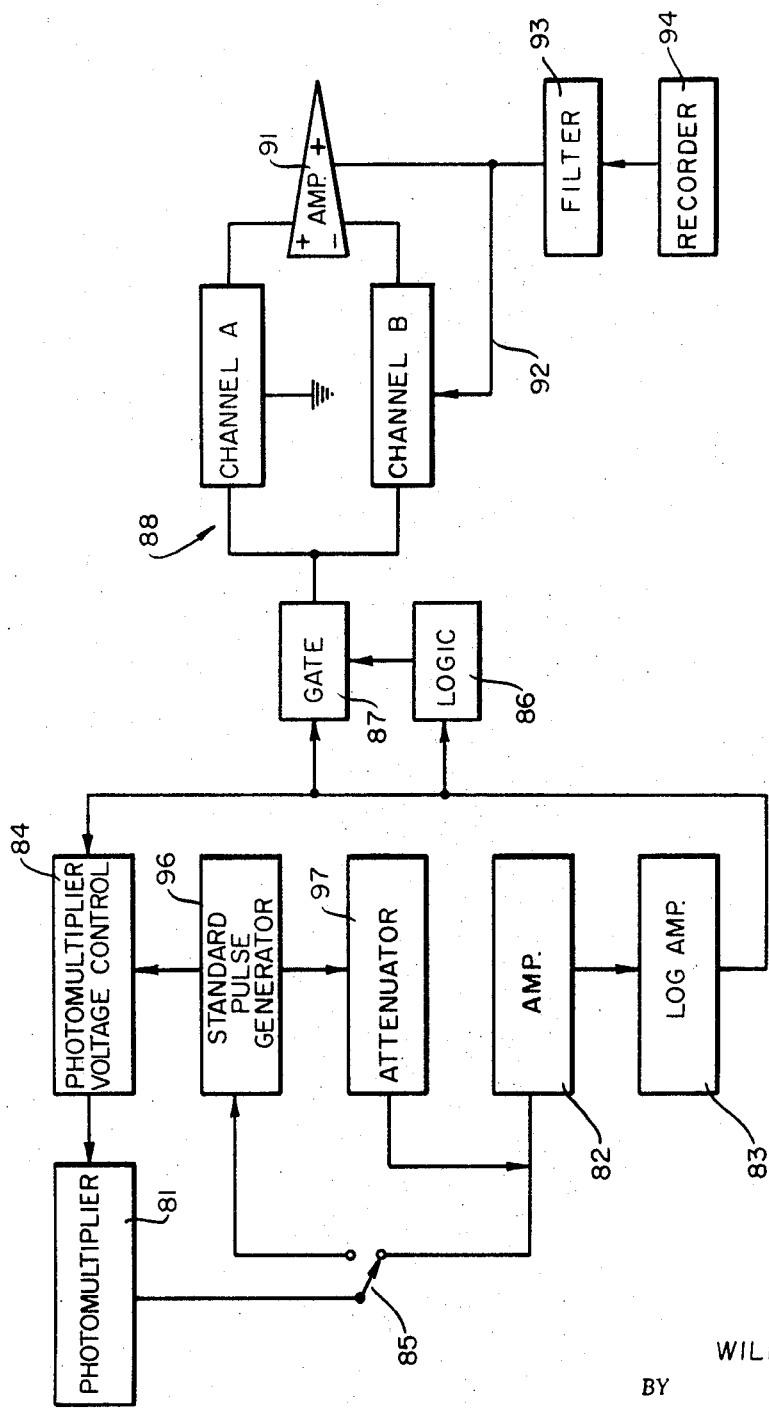
Figure 9:
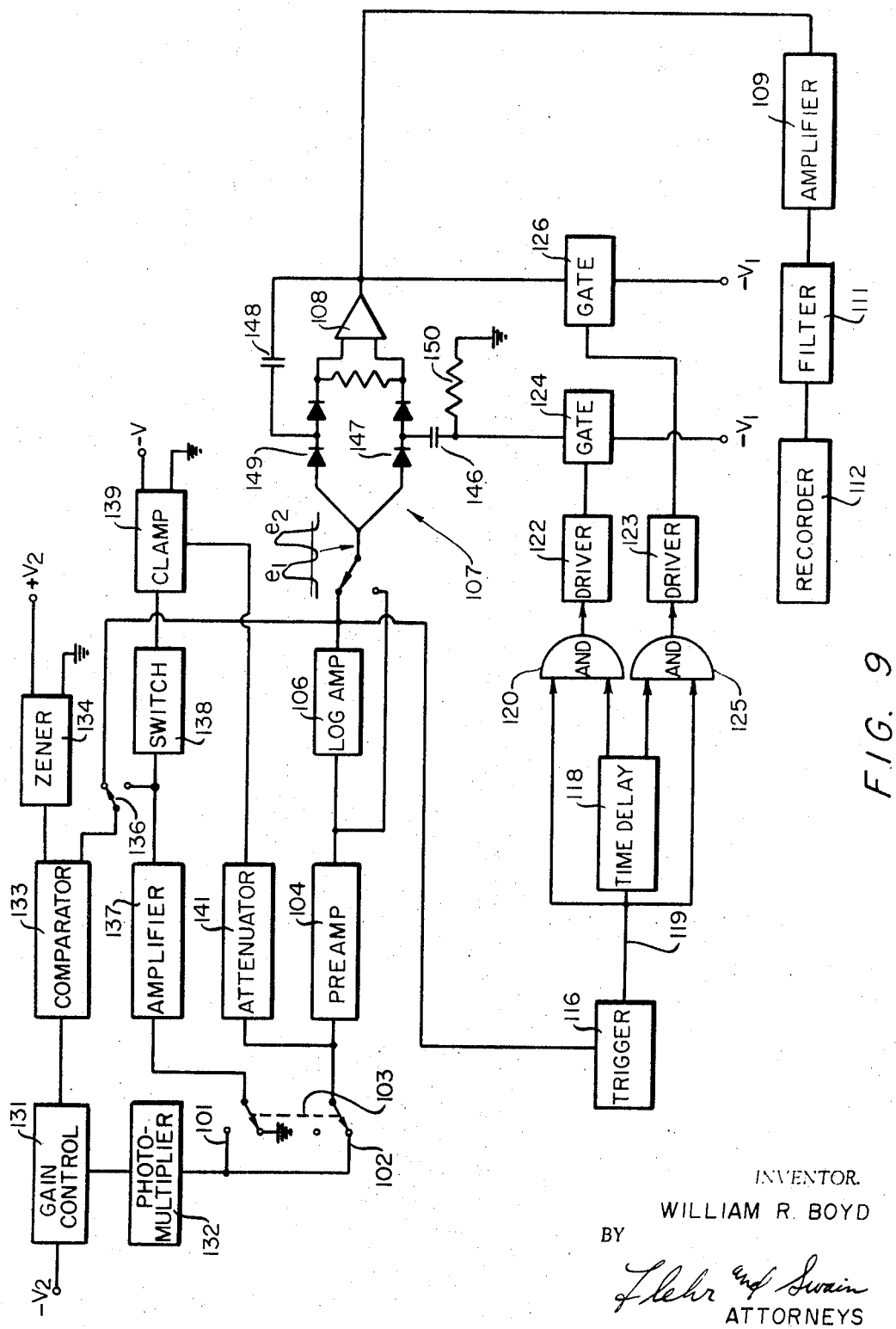
Figure 10:
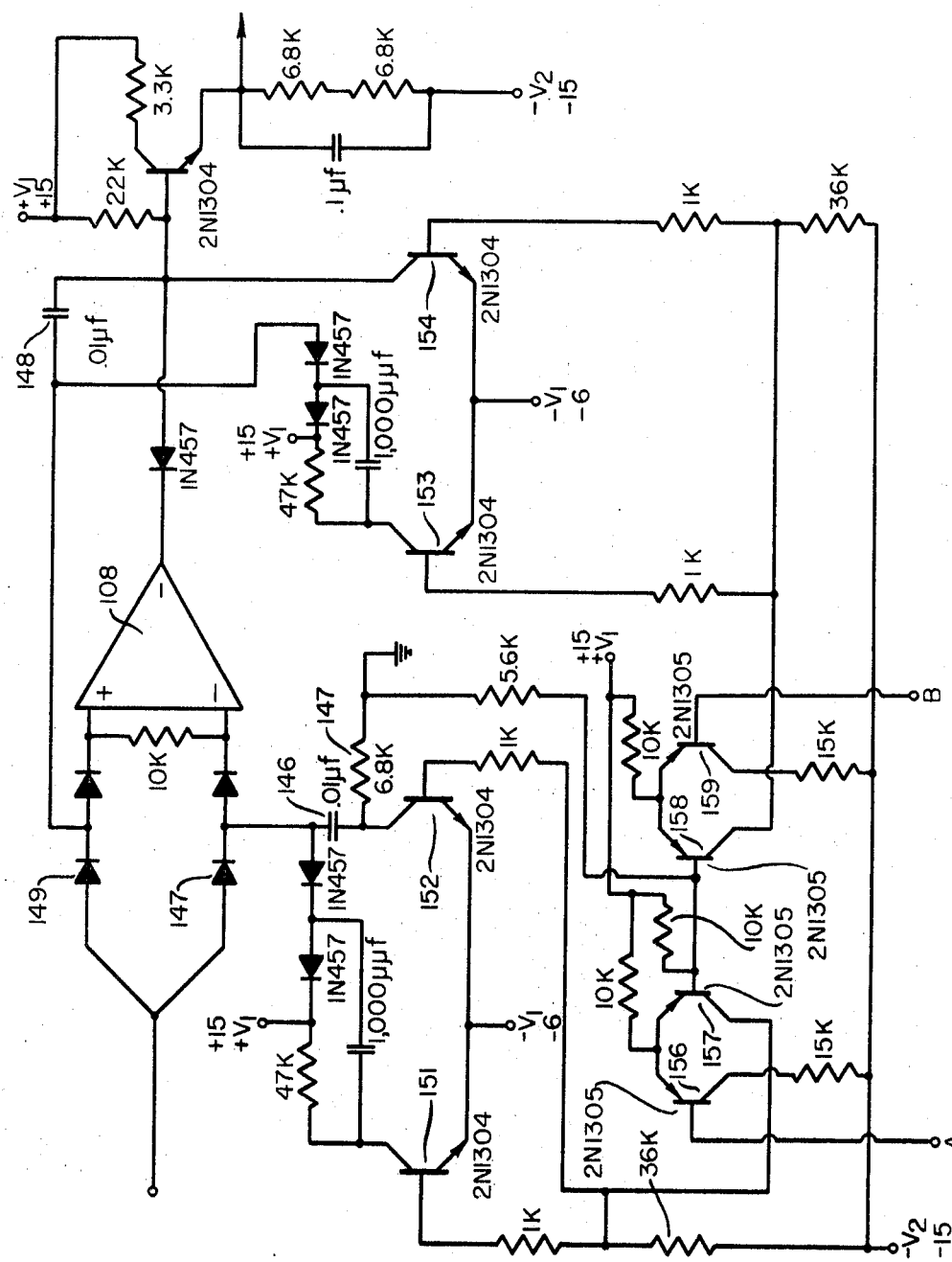

FIGURE 7 schematically illustrates the pulse formation during a rotation of the centrifuge;

FIGURE 8 is a simplified block diagram of the electrical circuits of a photoelectric scanning system;

FIGURE 9 is a more detailed circuit diagram of the electrical circuits of the photoelectric scanning system; and FIGURE 10 is a circuit diagram of the sample, hold and subtract circuit used in the photoelectric scanning system.

Briefly, the present invention includes a photoelectric scanning system for generating and recording electrical signals corresponding to the concentration distribution of material in an ultracentrifuge cell during centrifugation. The system comprises a suitable optical system for providing an image of the ultracentrifuge cell at an image plane. A photoelectric scanning system is employed for scanning across the image whereby variations in the light transmitted at different positions in the cell are converted to variations in an electrical signal. The system includes means for receiving and processing the electrical signal to provide an output signal. The system also includes means for generating a calibrating signal and applying the same to the system to calibrate the same.

Figure 1:
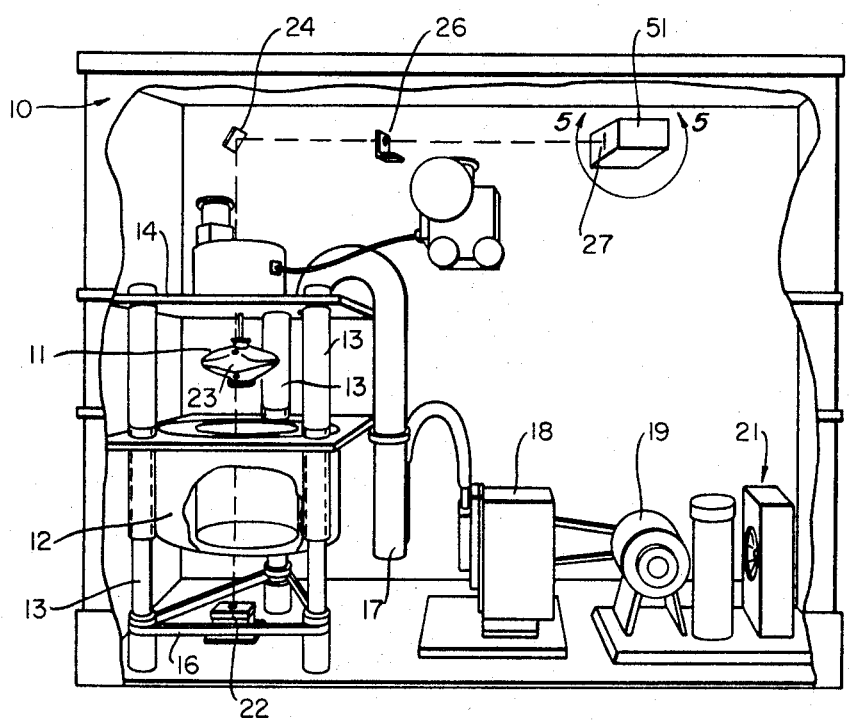
FIGURE 1 is a schematic diagram of an ultracentrifuge showing the drive means, rotor, refrigerator, vacuum pump, optical system and scanning device for measuring absorption.

Referring more particularly to FIGURE 1, there is shown an ultracentrifuge having a housing 10 which houses a centrifuge assembly. The centrifuge assembly includes a rotor 11 which rotates in a heavy steel chamber 12 mounted on spaced screws 13. Rotation of the screws moves the chamber upwardly into sealing engagement with a cover 14. The screws may be rotated, for example, by means of a chain 16. When the chamber is closed, it may be evacuated by a vacuum system including a diffusion pump 17 and backup pump 18 driven by a motor 19. The chamber 12 may be refrigerated by a refrigeration unit 21.

For continuously detecting sample concentrations, light from a slit source 22 is paralleled by a collimating lens (not shown) and directed through the cell 23 carried by the rotor 11. In the region of the sedimenting boundaries, the light rays suffer absorption which the system is designed to measure. The parallel light is condensed by condensing lens (not shown) which strikes a front surface deflecting mirror 24, passes through a lens 26 and forms an image on the image plane designated generally by the numeral 27.

Figure 2:
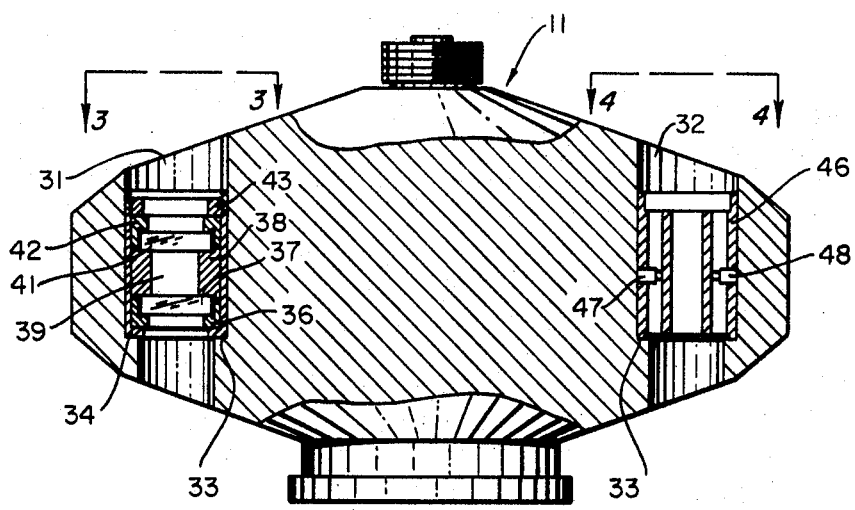
FIGURE 2 is an enlarged view of a rotor suitable for use in the ultracentrifuge of FIGURE 1.

Referring to FIGURE 2, there is shown an enlarged view of the rotor 11. The rotor shown includes cell openings 31 and 32 disposed diametrically opposite each other. Each of the openings comprises a hole formed through the rotor and having a lower shoulder 33. The sample cell includes an insert 34 adapted to receive a lower sealing ring 36, a window 37, a spacer 38 provided with one or more channels 39 for receiving sample, an upper window 41, upper sealing ring 42, and a threaded ring 43 for holding the assembly together.

Figure 3:
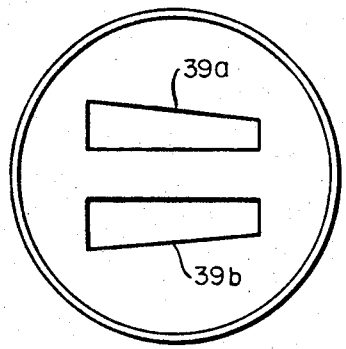
FIGURE 3 is a view taken generally along the line 3—3 of FIGURE 2 and showing the double sector cell.

The sample to be analyzed is contained within the chambers defined by the channels 39. For example, the insert 38 may include two separate openings 39a and 39b which are sector-shaped as shown in FIGURE 3.

Figure 4:
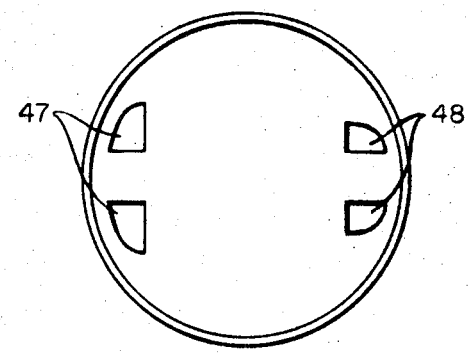
FIGURE 4 is a view taken along the line 4—4 of FIGURE 2 and showing the reference holes contained in the counter-balance cell.

Disposed on the diametrically opposite side of the rotor there is shown the counter-balance member 46 which includes spaced pairs of openings 47 and 48 which act as reference holes as will be presently described. These openings are more clearly shown in FIGURE 4. Generally, the two pairs of openings are spaced apart a distance which is greater than the length of the cells 39a, 39b, as will be presently described in detail. The openings of each pair are spaced apart a distance corresponding generally to the spacing between the cells 39a, 39b.

The photoelectric scanning mechanism 51 (FIGURES 1 and 5) is disposed at the image plane 27. The scanning mechanism may include a lead screw 52 with means (not shown) for rotating the same in either direction at a predetermined speed. The lead screw is threadably received by a follower 53 which carries the photomultiplier tube and housing 54. The housing is moved back and forth as shown by the arrow 55. A slit 56 having a predetermined width and length is disposed in front of the photomultiplier tube.

Figure 5:
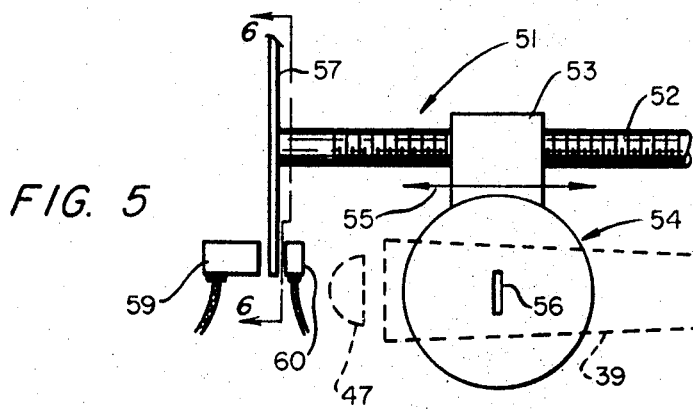
FIGURE 5 is a schematic view showing a photomultiplier tube and mount for scanning the tube across the cell image and the means for generating position markers.

Referring to FIGURE 5 particularly, there is shown in dotted outline the image of the reference holes 47 and 48 and the image of one cell 39.

Figure 6:
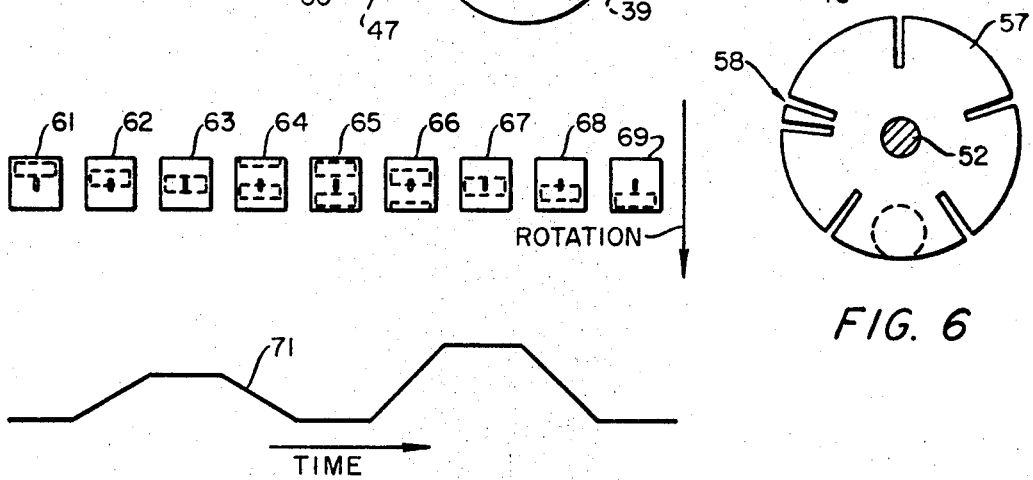
FIGURE 6 is a view taken generally along the line 6—6 of FIGURE 5 showing the position mark generating wheel.

The end of the lead screw 52 carries an apertured disc 57, shown in more detail in FIGURE 6. A double aperture 58 is located at one location. A light source 59 is disposed on one side of the disc and a photoresponsive device 60 is disposed on the other side. Thus, as the lead screw rotates, a pulse is generated as each of the apertures is in the light path between the light source 59 and photocell 60. These pulses serve to give the exact location of the slit 56 along with the image.

Thus, a magnified composite image of the cell sectors 39a, 39b, and the counter-balance reference holes 47, 48 is projected through the optical system to a plane at the photomultiplier slit. The photomultiplier and slit are mounted on a common carriage so that they can scan across the entire image. The slit is disposed perpendicular to the direction of travel. As the slit scans the image, the photomultiplier continuously detects variations in the amount of light transmitted by the contents of the cell. In the case of a double sector cell, both sectors are scanned almost simultaneously by the same optcial system. This means that the contents of the two sectors are observed under virtually identical conditions of light intensity, wave length, centrifugal forces, optics, etc. The detected light levels are transformed by the electronics circuits, to be presently described, into current pulses which may be proportional to the logarithm of the light levels. These current pulses which hold the desired information are compared with one another and their difference traced out on a curve on a recorded chart. This curve is a function curve. A separate circuit may be provided for determining the time derivative and tracing out a second curve which may be called the derivative curve. A marker pen along the edge of the paper can be synchronized with the multiplier carriage by taking the electrical output of the photocell 60 and providing marks or pips along the side margin of the paper to give a record of the position of the slit.

As will be presently described, built-in calibration circuits provide separate calibration patterns for each scan. The calibration pattern is inserted in the electronic circuits at the same point as is the absorption information from the photomultiplier tube so that it undergoes exactly the same processing as the absorption information and is traced out by the same pen only seconds ahead of the function curve. Thus, any variation in gain or other electronic characteristic which would affect the information also affects the calibration pattern by the same amount and are nullified.

Image 39, as shown in FIGURE 5, appears to be that of only one sector and of one pair of reference holes. Actually, when using a double-sector cell, the image is a composite image of the two sectors separated in time only by a few microseconds and the double reference holes are disposed 180° around the rotor. The time spacing between the sector images will depend on rotor speed. For example, at 60,000 r.p.m., it will take the rotor 5 or 6 microseconds to rotate the 2° between the cell sectors.

The photomultiplier tube is a combined light detector and electronic amplifier. The tube receives short bursts of light, produced by the sectors crossing the light beam, and converts these light pulses into current pulses that can be electronically compared. Operation of photomultiplier tubes is well known and will not be described in further detail.

The very narrow slit 56 allows only a small area of the image to be projected onto the photomultiplier tube at any one time. The area during any one rotation of the rotor is referred to as one sample of the image. Depending on rotor speed and scan rate, there may be formed several hundred to several hundred thousand of these samples in the time it takes the slit to scan across the image.

Referring to FIGURE 7, there is schematically shown pulses generated by the photomultiplier tube when a double-sector cell is employed. The upper portion of the figure shows slides in time sequence 61–69 depicting the position of the slit and sector images for different periods of time as the image of the double-sector cell moves past the slit. The lower curve 71 shows the current output from the photomultiplier tube. Slide 61 shows the image of the cell sector and the slit just as the image is approaching the slit; there is no current output. Slide 62 shows the beginning of a pulse as the edge of the cell image strikes the slit. Slide 63 shows the slit completely covered by the cell image and maximum current output. Slide 64 shows the cell image leaving the slit and the current decreasing. Slide 65 shows the slit between the sectors and no current output. Slides 66, 67, 68 and 69 show a similar sequence with the second sector. As shown in FIGURE 7, the first pulse is the pulse containing the solution wherein there is more absorption of light than in the second sector which contains the solvent. The approximate time between the beginning of the first pulse and the beginning of the second pulse at 60,000 r.p.m. is approximately 14 microseconds.

The following is a general description of the electronic circuits for processing the photomultiplier output shown generally in block diagram of FIGURE 8. The pulses developed by the photomultiplier circuits 81 are amplified by an amplifier 82 and applied to a log amplifier 83. The output of the log amplifier is the logarithm of the input, making it possible to eventually measure the output direcly in units of optical density rather than in percent transmission. The log amplifier output is fed to the high voltage control circuits 84 and to the logic and gate circuits 86 and 87, respectively. The output of the log amplifier is gated and applied to a sample and hold circuit designated generally by the reference numeral 88.

To recognize and separate the two pulses generated by the photomultiplier tube, high speed switching circuits 86, 87 are employed. The switching action is synchronized with the speed of the rotor so that the pulses are gated to different channels for processing. Since the rotor speed is arbitrary, the width of the pulses and the space between them will vary a great deal—even during a single run. For this reason, the switching action is not set to any predetermined timing but is asynchronous, that is, triggered by the first burst of light in each revolution of the rotor and reset after the light disappears. Timing accuracy is thus made completely independent of rotor speed and the circuits will work equally well if the light pulses are from the reference holes, the reference cell or the sample cell.

The sample, hold and subtract circuit 88 samples the size of the first pulse, then remembers it by storing it in a holding circuit while it samples the second pulse. After the second pulse is sampled, the rotor will have blocked all light to the scanner for the remainder of that revolution so that there is ample time to compare the two pulses. During this "dark" time, the switching circuit resets itself and waits for the next pulse.

The primary purpose of the sampling and holding circuits is to bring the two pulse amplitudes together in time so that they can be subtracted one from the other and to produce a continuous output of updated information.

To indicate the height difference between the two sampled and stored pulses, each pulse is connected to one of the two inputs of a balanced differential amplifier 91. The output signal from the differential amplifier is "floating," that is, free to swing instantly either positive or negative relative to the output level established by the previous pair of pulses measured. The output signal is only at equilibrium when the voltage level at the two inputs is identical. If one pulse is higher than the other, the voltage levels at the inputs will be unequal and the output signal will swing either positive or negative depending on which pulse is higher.

The differential amplifier circuit contains a feedback network designated by the line 92 which immediately rebalances the input voltages if they are unequal. When the unbalanced input causes the output signal to change, this change in voltage is fed back to the channel B input where it either adds or subtracts just enough voltage to make the two input voltages identical. The output voltage must, therefore, always be equal to the voltage difference between the two pulses and it is this output voltage that indicates the differences between the two pulses. Since the differential amplifier is reacting very swiftly to a train of discrete high speed pulses, the information emerges as a varying signal composed of tiny steps each representing one "sample" of the cell image. The step pattern is filtered by a filter 93 into a smooth signal. The signal is then applied to a recorder 94 which traces the function curve.

The filtering is such that "unwanted" noise on the output signal to the recorder is removed. This noise signal is characteristically both of high frequency and low level. To suppress this but not unduly affect the larger high frequency information that is part of the signal, an adjustable non-linear filter is used. The amount of filtering may be varied to suit the circumstances.

The photomultiplier voltage control 84 serves to receive the output signals and to assure that the current from the photomultiplier tube remains substantially constant for the solvent sector by sampling the output voltage from the log amplifier and altering the voltage to the photomultiplier to maintain it at a constant level.

To calibrate the electronic system, the switch 85 is switched to its upper position whereby the output of the photomultiplier is applied to a standard pulse generator 96 which generates a pulse of standard height. The standard pulse is applied to a stepped attenuator 97 which provides current pulses of discrete amplitudes to amplifier 82. Since operating conditions are such that the output current of the photomultiplier is directly proportional to the amount of light striking it, an electrical standard may be substituted for an optical standard at this point. The series of standard size pulses are, in effect, electrical analogs of ten 0.2 O.D. filters placed successively in the light path making a total of 2.0 O.D. The pulses appear on a chart as a series of ten steps which mark off ten divisions between zero and 2 O.D. When the scanner is in the 1 O.D. range, only the last five steps are traced. In practice during the calibration step the pulse signal from standard pulse generator 96 is fed by way of attenuator 97 to channel B of the sample, hold and subtract circuitry 88 while channel A is connected by a switch (not shown) to the reference voltage source $+V_2$ (FIG. 9). In this manner the pulse train derived from standard pulse generator 96 and selectively attenuated in discrete steps by attenuator 97 is subtracted from a reference signal having a predetermined and constant amplitude to produce a stairstep shaped electrical calibration signal. This calibration signal is then fed to recorder 94 wherein it is recorded alongside the function curve for comparison purposes.

The output density of any point on the function curve is determined by simply following a rule line on the chart to a parallel point on the adjacent stairstep pattern. A new calibration is drawn just before each scan so that the positions on the chart will be identical for both the calibration pattern and the basic curve. The calibration steps can be independently shifted with respect to the function curve. A plot of zero O.D. can be generated from the double reference holes and gives information to position the calibration steps to give an absolute rather than a relative calibration.

FIGURE 9 shows a more detailed circuit diagram of the photoelectric scanning system. The photomultiplier output is applied to the terminals 101 and 102 of switch 103. In the switch position shown, the preamplifier 104 is connected to receive the output of the photomultiplier tube. The output of the preamplifier is applied to log amplifier 106. The output of the log amplifier is applied to the sample, hold and subtract circuits 107. The circuits 107 include differential amplifier 108, the output of which is applied to an amplifier 109. The output of amplifier 109 is filtered at 111 and applied to recorder 112. In order to keep track of which pulse is which, assuming a double-sector cell operation, it is first necessary to detect the presence of pulses. This is conveniently done by looking at the output of the log amplifier 106 with a bistable circuit, dependent only on the level of the incoming signal. Such a circuit is preferably a Schmitt trigger 116. The hysteresis of the Schmitt trigger avoids instabilities in the presence of noisy or marginally sized incoming signals. The smallest signal to be observed must be greater than an upper trigger level and the dip between signals must fall below a lower level to trigger in the other direction. Alternative means of producing gating pulses as cells come around would involve accurate timing delays and either level sensors or rotor position sensors. As previously described, the advantage of this scheme includes elimination of rotor position sensors and of front panel controls which need to be adjusted with r.p.m.

Following the Schmitt trigger 116, there is a time delay circuit 118. The delay circuit 118 is started by the trailing edge of the Schmitt pulse applied along line 119. Succeeding Schmitt pulses do nothing to the timer until it times out. The trailing edge of the next pulse then starts the timer. Suitable signals are taken from the timer and fed to diode transistor logic AND circuits 120, 125. The trailing edge of the first output from the trigger circuit 116 starts the time delay circuit 118. It is also applied to the AND circuit 120 which passes the signal to the driver 122. The next pulse is blocked by the AND circuit 120 because of the output of the time delay 118 but is passed by the AND circuit 125 due to the input from the time delay circuit. Thus, a pulse which finds the time delay dormant will be gated by AND circuit 120, while with the time delay active, a pulse is gated by AND circuit 125. The output of the AND circuits 120, 125 is applied to drivers 122 and 123, respectively, which drive gates or switches 124 and 126 to control the routing of a signal to the sample, hold and subtract circuits 107.

The photomultiplier is provided with a gain control 131 which controls the high voltage $-V_2$ applied to the photomultiplier tube 132. The gain control is controlled by a comparator 133 which serves to receive a reference signal from a Zener diode 134 connected to a voltage source $+V_2$ and to receive the output from the log amplifier. The comparator serves to compare these signals and vary the gain control until these two signals have a predetermined relationship.

During the calibration cycle, the switch 103 is switched to its other position as is the switch 136. The output pulses from the photomultiplier are amplified by amplifier 137 and applied to the comparator 133 which serves to control the voltage gain. The amplified signal is also applied to switch 138 which drives a clamp 139. The clamp clamps the input to the attenuator 141 to a predetermined voltage indicated as $-V$. This voltage $-V$ is then applied to the attenuator 141. That is to say, switch 138 and clamp 139 serve as the standard pulse generator 96 (FIG. 8) to provide a constant and predetermined amplitude pulse in response to each pulse signal from photomultiplier 132. The attenuator is stepped, as previously described, and its output applied to the preamplifier 104. Also, in practice, during the calibration cycle gates 124 and 126 are driven directly by the output of Schmitt trigger 116 so that they open and close simultaneously.

A more detailed explanation of the circuits 107 is now presented. The sample, hold and subtract circuits 107, in accordance with the invention, include an amplifier 108 having a differential input, very high common mode rejection, high gain and high impedance to ground from either input. Such an amplifier may, for example, be an amplifier known as the Philbrick Model P–2.

As previously described, the Schmitt trigger and associated logic circuits serve to close gates or switches 124 and 126 which serve to direct the pulses and operate the sample and hold circuit. When the first gate 124 is energized, the time of the first signal pulse, the gate closes and the voltage across capacitor 146 approaches a voltage $E_1$ which is the sum of the voltage $-V_1$ and $e_1$, ignoring the drops across the charging diode 147. When the gate 124 is open (between incoming pulses), the end of the capacitor 146 connected to the gate 124 is at ground, since no current can flow through the charging diode 147 in the reverse direction and the impedance seen through the other diode connected to capacitor 146 is very high. Therefore, no current flows through the resistor 150 and the bottom end of the capacitor 146 remains at ground. The top of the capacitor 146 is at a voltage $E_1$ equal to the sum of $+V_1+e_1$ positive with respect to ground.

When the next pulse occurs, gate 126 is closed and the amplifier output voltage is forced to the voltage $-V_1$. The capacitor 148 charges to a voltage $E_2$ which is the sum of $+V_1$ and $e_2$. When the gate 126 opens, the output of the amplifier rises to a level which produces zero difference between the voltages at the inputs. In actuality, this may amount to a millivolt or so. Capacitor 148 has no discharge path, since it sees only the back biased diode 149 and the input impedance of the amplifier. Since the voltage at the input terminals to the amplifier are virtually equal, the output voltage is $$E_1 - E_2 = (V_1 + e_1 - (+V_1 + e_2)$$
$$= V_1 + e_1 - V_1 - e_2$$
$$= e_1 - e_2$$

It is noted that the voltage $+V_1$ drops out so long as it is constant during both sampling times. The important consideration is that $-V+e_1$ for $e_1$ minimum be greater than any $e_2$ which will be produced. This ensures that the charging diodes will remain back biased until the proper gate closes the switch. Hence, the information is sampled and held until the next set of gates comes along. In actuality, discharge paths are provided which are in the order of 20 megohms or more to give stability. Provision is made to equalize the discharge rates so that the amplifier output does not change between samples.

Referring more specifically to FIGURE 10, a detailed circuit diagram of the sample, hold and subtract circuits schematically illustrated in FIGURE 9 is shown. The transistors 151 and 152 and associated circuitry form the gate 124, while the transistors 153 and 154 form the gate 126. Transistors 151, 153 and associated circuitry serve to discharge the holding capacitors 146 and 148, respectively, so that rapidly decreasing input pulses $e_1$ and $e_2$ can be accurately followed. The transistors 156 and 157 and associated circuitry form the driver 122, while the transistors 158 and 159 form the driver 123. The remainder of the components bear like reference numerals and the values of the resistors, capacitors and type of transistors and diodes for a circuit constructed in accordance with the invention are given. A system including a circuit such as shown was constructed and gave readings of optical density of a sample from zero to 2 O.D. with rotor speeds varying between 1000 r.p.m. and 60,000 r.p.m.

Thus, there is provided a photoelectric scanning system for centrifuges capable of providing electrical signals corresponding to concentration of material in an ultracentrifuge cell during centrifugation. The system is easily calibrated. The electrical signals are useful, for example, to drive a recorder for providing a record of the concentration distribution.

I claim:
1. A photoelectric scanning system for monitoring concentration distribution of materials in at least one ultracentrifuge cell during centrifugation comprising an optical system for projecting an image of the cell, means including a photo-responsive device for scanning the image to provide a first electrical signal whose amplitude varies in accordance with variations in the intensity of light transmitted by the cell, means for receiving and processing the electrical signal to provide a second electrical signal representative of the concentration distribution of the material being centrifuged, means responsive to the first electrical signal derived from said photo-responsive device for generating at selected time intervals an electrical calibration signal and means for applying the electrical calibration signal to said means for receiving and processing the electrical signal.

2. A system as claimed in claim 1 wherein said means for generating a calibration signal includes means for generating a pulse signal having a predetermined amplitude and an attenuator for progressively attenuating the amplitude of said pulse signal.

3. A photoelectric scanning system for monitoring the concentration distribution of a sample as it is subjected to centrifugation wherein the sample is contained in one sector of a double sector centrifuge cell and a reference solvent is contained in the other sector comprising:

an optical system for producing an image of the double sector cell;

a photoresponsive device for scanning the image to provide a first electrical pulse signal whose amplitude is proportional to the intensity of light transmitted by the sample sector and a second electrical pulse signal whose amplitude is proportional to the intensity of light transmitted by the sample sector and a second electrical pulse signal whose amplitude is proportional to the intensity of light transmitted by the reference sector;

means for sequentially sampling and holding said first and second pulse signals;

means coupled to said sampling and holding means for subtracting the amplitude of the first pulse signal from the amplitude of the second pulse signal to provide an electrical signal whose amplitude is the difference between the amplitude of said first and second pulse signals;

means responsive to the output of said photoresponsive device to generate at predetermined time intervals an electrical calibration signal; and circuit means for directing the electrical calibration signal through said sample, hold and subtracting means.

4. A photoelectric scanning system as defined in claim 3 wherein said means for generating an electrical calibration signal comprises means for generating a signal having a predetermined amplitude and an attenuator for progressively attenuating in discrete steps said predetermined amplitude signal.

5. A photoelectric scanning system as defined in claim 4 comprising in addition means for comparing said second pulse signal with a signal having a predetermined amplitude to produce an error signal and means for applying said error signal to said photoresponsive device to automatically adjust the amplitude of the second electrical pulse signal to maintain the amplitude of said second pulse signal at a constant and predetermined level.

6. A photoelectric scanning system for monitoring the concentration distribution of a sample as it is subjected to centrifugation wherein the sample is contained in one sector of a double sector centrifuge cell and a reference solvent is contained in the other sector comprising:

means for producing an image of the double sector cell;

a photoresponsive device for scanning the image and providing a first electrical pulse signal whose amplitude is a function of the intensity of light transmitted through the sample sector and a second electrical pulse signal whose amplitude is a function of the intensity of light transmitted through the reference sector;

means for sampling and holding the electrical pulses produced by said photoresponsive device, said means including a first holding means connected in series with a first gate and a second holding means connected in series with a second gate;

a source of voltage;

circuit means for connecting each of said series connected gate and holding means in series with said voltage source;

means responsive to the output of said photoresponsive device for alternately closing said first and second gates to thereby alternately sample and hold said first and second electrical pulse signals; and means coupled to both said first and second holding means for comparing the amplitude of said first and second electrical pulses to provide an electrical signal whose amplitude is the difference between the amplitudes of said first and second pulses.

7. A photoelectric scanning system as defined in claim 6 wherein the means for alternately closing said first and second gates comprises:

time delay means connected to the output of said photoresponsive device and normally conditioned to close said first gate and open said second gate, said time delay means being responsive to the trailing edge of said first output pulse to open said first gate and close said second gate and adapted to be automatically reset after a predetermined time period to place the first and second gates in their original state.

8. A photoelectric scanning system as defined in claim 7 comprising in addition a logarithmic circuit means interposed between said photoresponsive device and said sample, hold and subtract means.

9. A photoelectric scanning system for use with a centrifuge system to monitor the concentration distribution of a sample as it is subjected to centrifugation wherein the sample is contained in one sector of a double sector centrifuge cell and a reference solvent is contained in the other sector comprising:

means for producing an optical image of the double sector cell;

means including a photoresponsive device for scanning the image and providing a first electrical pulse train consisting of a first series of pulses whose amplitudes are a function of the intensity of the light transmitted through the sample sector interleaved with a second series of pulses whose amplitudes are a function of the intensity of the light transmitted through the reference sector;

means for routing said first series of pulses to a first holding circuit and routing said second series of pulses to a second holding circuit;

means for subtracting the amplitudes of successive pairs of said first and second pulses in said electrical pulse train to produce a second electrical signal whose amplitude varies as a function of the difference between the amplitude of said first and second series of pulses;

means for recording said second electrical signal;

means coupled to the output of said photoresponsive device to generate a third electrical signal having a predetermined amplitude;

means for progressively attenuating said third electrical signal;

circuit means for directing the third electrical signal through said holding means and said subtracting means to provide an electrical calibration signal; and means for recording said calibration signal alongside said second electrical signal.

10. A photoelectric scanning system as defined in claim 9 wherein said photoresponsive device is repetitively scanned across the optical image and the electrical calibration signal is generated immediately prior to each scan of the photoresponsive device.

11. In a photoelectric scanning system for use with a centrifuge to monitor the concentration distribution of a sample solution contained in a centrifuge cell as it is subjected to centrifugation wherein the system includes an optical system for producing an image of the centrifuge cell, a photomultiplier for scanning the image to produce an electrical signal whose amplitude varies as a function of the intensity of the image, circuit means for processing the electrical signal to provide an information signal indicative of the concentration distribution of the sample and recording means for recording the information signal; the improvement comprising: means responsive to the signal output of said photomultiplier to generate a predetermined amplitude electrical pulse signal at selected time intervals, means for progressively attenuating said pulse signal in discrete steps, means for comparing said attenuated pulse signal with a standard reference signal having a predetermined amplitude to provide an electrical calibration signal and means for recording said electrical calibration signal.

References Cited

UNITED STATES PATENTS

| | | | |
|---|---|---|---|
| 2,630,736 | 3/1953 | Beitz | 88—14 |
| 3,171,032 | 2/1965 | Holt | 250—207 |
| 3,354,772 | 11/1967 | Topol | 250—218 |

RALPH G. NILSON, Primary Examiner

MARTIN ABRAMSON, Primary Examiner

U.S. Cl. X.R.

356—201

PO-1050
(5/69)

UNITED STATES PATENT OFFICE
CERTIFICATE OF CORRECTION

Patent No. 3,470,381      Dated September 30, 1969

Inventor(s) William R. Boyd

It is certified that error appears in the above-identified patent and that said Letters Patent are hereby corrected as shown below:

Column 9, Line 21, delete "sample sector and a"

Column 9, Line 22, delete

Column 9, Line 23, delete

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents